United States Patent [19]

Haag et al.

[11] 4,097,367
[45] Jun. 27, 1978

[54] CONVERSION OF OLEFINIC NAPHTHA

[75] Inventors: Werner O. Haag, Lawrenceville; Tracy J. Huang, Trenton, both of N.J.

[73] Assignee: Mobil Oil Corporation, New York, N.Y.

[21] Appl. No.: 818,632

[22] Filed: Jul. 25, 1977

[51] Int. Cl.$^2$ ............................................. C10G 35/06
[52] U.S. Cl. ................................. 208/135; 208/138; 260/673; 260/673.5
[58] Field of Search ................ 208/135, 138; 260/673, 260/673.5

[56] References Cited

U.S. PATENT DOCUMENTS

| | | | |
|---|---|---|---|
| 3,855,115 | 12/1974 | Morrison | 208/135 |
| 3,871,993 | 3/1975 | Morrison | 208/135 |
| 3,890,218 | 6/1975 | Morrison | 208/135 |
| 3,914,171 | 10/1975 | Schoennagel | 208/135 |

Primary Examiner—C. Davis
Attorney, Agent, or Firm—Charles A. Huggett; Carl D. Farnsworth

[57] ABSTRACT

High severity catalytic conversion of olefinic naphthas which contain diolefins is conducted over special catalysts to yield a product stream which contains little or no non-aromatics boiling in the range of benzene, toluene and xylene. The catalysts are combinations of zinc and a metal of Groups I B and VIII of the Periodic Table with a crystalline aluminosilicate zeolite having a silica/alumina ratio greater than 12 and a constraint index not less than one nor greater than 12.

8 Claims, 2 Drawing Figures

SCHEMES for PYROLYSIS GASOLINE UPGRADING

Zeolitic Aromatization

Conventional (Hydrotreating + Solvent Extraction)

SCHEMES for PYROLYSIS GASOLINE UPGRADING

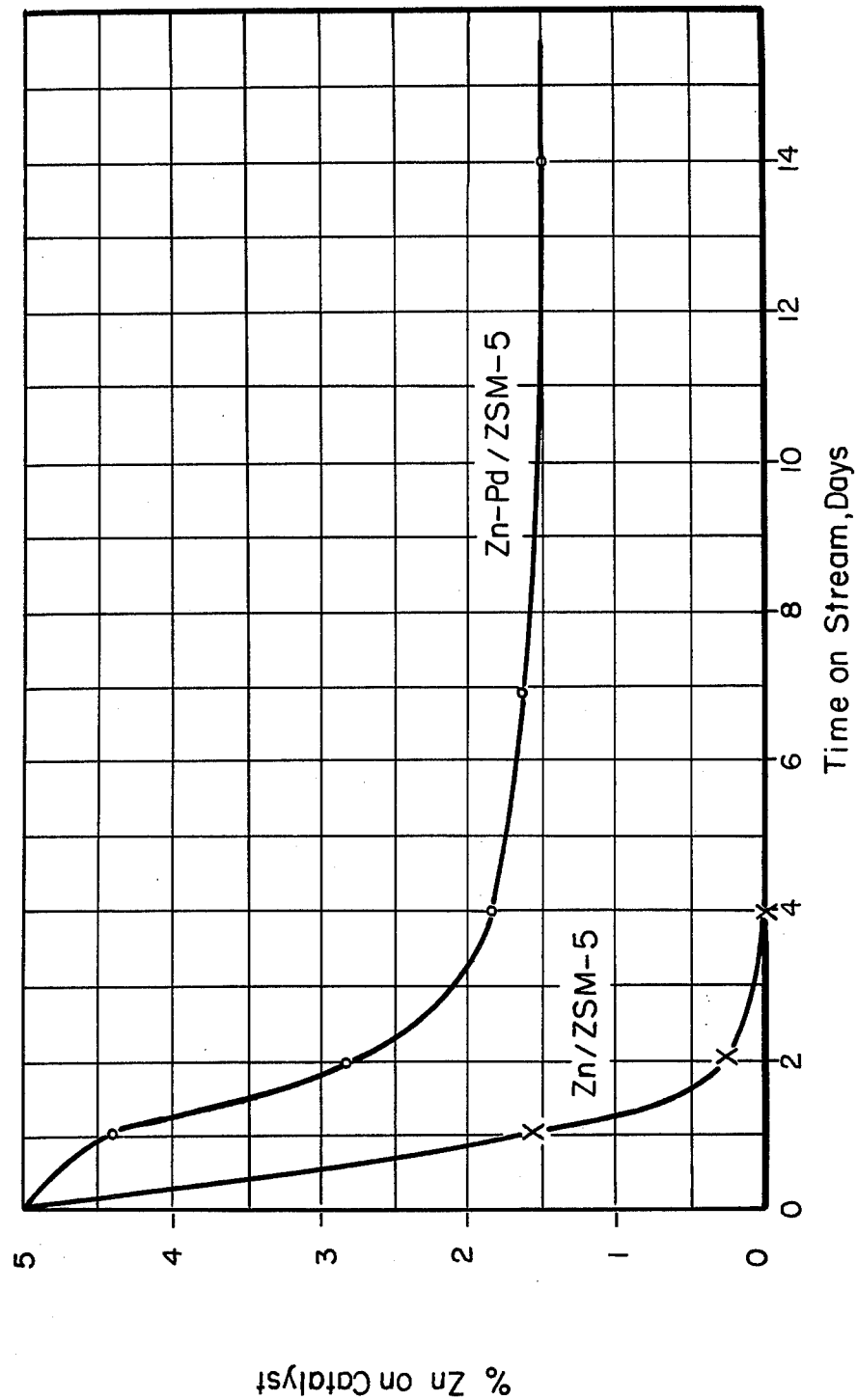

CONVERSION OF OLEFINIC NAPHTHA

FIELD OF THE INVENTION

The invention is concerned with manufacture of the valuable raw chemicals benzene, toluene and xylene from such highly olefinic charge stocks as pyrolysis gasoline from steam cracking to make ethylene. These charge stocks normally contain substantial amounts of diolefins. Those components, particularly the conjugated diolefins are very susceptible to polymerization and will form high boiling polymers which degrade to solid deposits of low hydrogen content, usually referred to as "coke". For that reason, it is conventional to subject pyrolysis gasoline and related raw materials such as dripolene and coker gasoline to multi-stage hydrogenation before processing for recovery of aromatic content.

In the production of olefins, especially ethylene and propylene, by subjecting petroleum fractions, such as naphthas, to severe thermal cracking, usually in the presence of steam, a considerable quantity of pyrolysis gasoline is produced which is unsuitable for use in motor fuels due to its tendency to form excessive quantities of gum during storage. This thermally cracked gasoline contains substantial proportions of both diolefins and mono-olefins as well as aromatic compounds and perhaps some acetylenic materials. The more reactive diolefins among the diolefins therein are particularly undesirable by reason of their known tendency to polymerize and form gums upon prolonged standing. Mono-olefins in general are desirable constituents of motor fuels as they have relatively high octane ratings, and aromatic hydrocarbons are superior in this regard.

Conventional hydrogen treatments for stabilizing such hydrocarbon mixtures are not entirely satisfactory because of their lack of adequate selectivity and also the usual relatively high operating temperatures. For example, the hydrogenation may not end with simply partial saturation of the diolefins to olefins but also frequently saturates the mono-olefins comletely and even hydrogenates substantial proportions of the aromatic hydrocarbons to less valuable naphthenes. Polymerization of diolefins with consequent contamination and deactivation of the catalyst with gummy deposits or coke often occurs. Such polymerization may be of the thermal type induced by high temperatures, or it may be of a catalytic type inaugurated by the hydrogenation catalyst, as good hydrogenation catalysts frequently possess substantial polymerization activity also. The polymeric deposits are high undesirable as they not only reduce the hydrogenation activity of the catalyst, thereby requiring frequent regeneration but also tend to plug up piping and other equipment.

Selective hydrogenation is also employed in multi-stage hydrogenation reactions as for instance in the preparation of pyrolysis gasoline for the extraction of its aromatic hydrocarbon content by well-known solvent extraction techniques as exemplified by extraction with diethylene glycol. To prepare a suitable feed for the solvent extraction, it is necessary to convert the organic sulfur compounds to a readily separable material, such as hydrogen sulfide gas, to saturate the unstable gum forming diolefins and also to saturate the mono-olefins without at the same time converting aromatic hydrocarbons into naphthenes by excessive hydrogenation.

It is not feasible to completely saturate and desulfurize such feedstocks in a single operation because the relatively high temperatures suitable for hydrodesulfurization (typically at least about 450° F.) also promote the formation of coke and polymers or gums, and such temperatures may hydrogenate aromatics to naphthenes under certain conditions. Even conducting the hydrogenation reactions in several stages to avoid or minimize the aforesaid difficulties has not been entirely satisfactory by reason of the accumulation of polymeric deposits that reduce the activity of hydrogenation catalysts, thereby requiring frequent regeneration. In addition, such deposits also plug up piping and other equipment. Not only thermal polymerization but also catalytic polymerization must be minimized as many good hydrogenation and desulfurization catalysts also catalyze the polymerization of diolefins. While various techniques are known for at least partially reducing the polymer formation of hydrocarbons at elevated temperatures, nevertheless polymer formation remains a critical problem in commercial plants for the selective hydrogenation of charging stocks of the type described.

The pyrolysis reaction is carried out in conventional equipment under noncatalytic and relatively severe thermal cracking conditions for petroleum stocks, as exemplified by temperatures in the range of about 1250° to 1600° F., pressures of 0 to 40 pounds per square inch gage (p.s.i.g.) and reaction times of about 0.2 to 4.0 seconds. A wide variety of pyrolysis feeds may be utilized including gas oils, naphthas, middle distillates, pentanes and light, normally gaseous hydrocarbons such as ethane, propane and butanes. These may be of varying degrees of purity. A substantial proportion of the organic sulfur compounds therein are converted by pyrolysis into carbon disulfide which may be recovered by condensation of the normally liquid fraction of the pyrolysis product or by fractional distillation thereof to produce a cut with an initial boiling point below 115° F. Excessive concentrations of carbon disulfide in the pyrolysis product may be reduced to the desired extent by scrubbing with aqueous caustic soda with the rate of introducing caustic soda solution adjusted to produce the desired reduction of organic sulfur, including carbon disulfide.

According to conventional practice, aromatic hydrocarbons, particularly benzene, toluene and xylene (BTX) are recovered by solvent extraction, as with ethylene glycol, from stabilized pyrolysis gasoline which has been subjected to at least two stages of hydrotreating, for example by the techniques described in U.S. Pat. Nos. 3,239,453 and 3,239,454.

A class of catalysts which have become available recently have been shown to be effective for processing of aromatic naphthas by a variety of cracking in the presence of hydrogen. The catalysts so employed are exemplified by zeolite ZSM-5 in combination with a metal having power to catalyze hydrogenation/dehydrogenation reactions. These catalysts have been described for production of BTX from heavy aromatic naphthas, primarily reformates, in U.S. Pat. Nos. 3,957,621 and 3,945,913. These techniques are operative in conversion of pyrolysis gasoline fractions but, since they handle only the heavy end above seven or eight carbon atoms, they can be applied only to a minor part of pyrolysis gasoline which contains very low concentration of such heavy aromatics.

Catalysts of the same general type, exemplified by ZSM-5, are known to be useful for conversion of olefins to aromatics, preferably in the absence of hydrogen. Such process in which the zeolite is associated with a metal such as zinc or palladium is described in U.S. Pat.

No. 3,813,330. See also U.S. Pat. Nos. 3,756,942 and 3,760,024. Combination catalysts of zeolite ZSM-5 with palladium and zinc are described for relatively low temperature reactions under hydrogen pressure, i.e., catalytic hydrodewaxing, in U.S. Pat. No. 3,980,550.

SUMMARY OF THE INVENTION

The invention applies the known catalyst of certain zeolites combined with zinc and palladium or another metal from Groups IB and VIII of the Periodic Table to conversion of certain specific charge stocks containing diolefins, usually in addition to aromatic hydrocarbons, preferably of the mono-cyclic type, at conditions of high severity, i.e., high temperature and low space velocity. At the temperatures here contemplated in the range 900° to 1200° F, metallic zinc has a substantial vapor pressure. In a reducing atmosphere, zinc is maintained in the metallic form and is eluted from the porous zeolite. The metal of Group IB or VIII inhibits elution but has no catalytic effect in the combination. Strangely, the second metal (Group IB or VIII) is relatively ineffective in the absence of zinc. The very powerful metal palladium actually is seen to have an adverse effect on course of the reaction in the absence of zinc.

DESCRIPTION OF DRAWINGS

These objects and advantages of the invention are illustrated by the annexed drawings wherein:

FIG. 2 is a graphical representation of elution of zinc from zeolite ZSM-5 alone as compared with combination of zinc and palladium.

DESCRIPTION OF PREFERRED EMBODIMENTS

Figure 1:
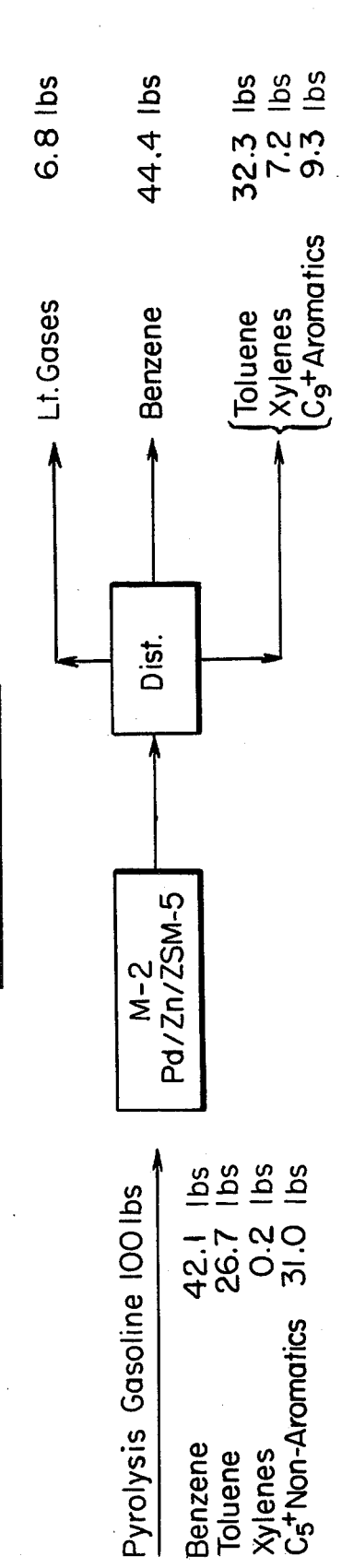
FIG. 1 is a diagrammatic comparison of processing according to this invention and by the technique conventional in the art.
Figure 1:
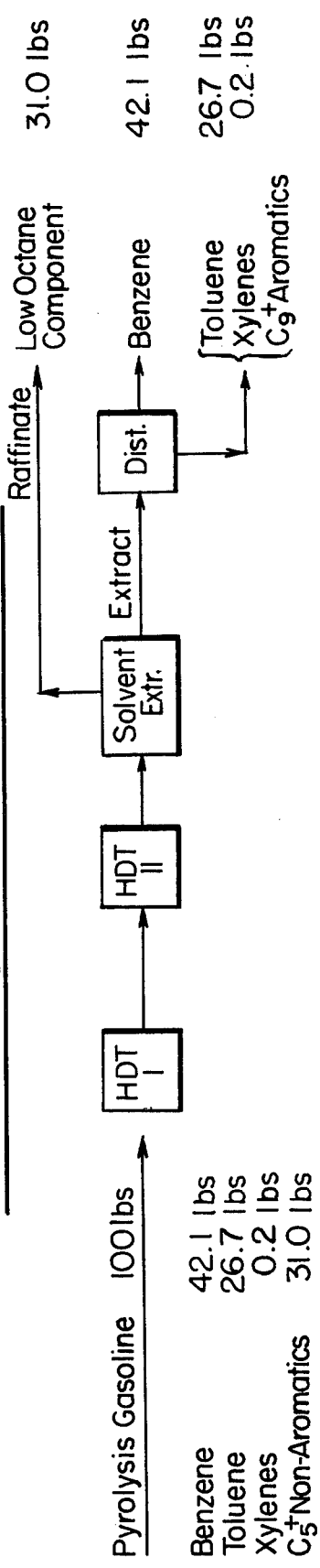

The charge stock for practice of the process of this invention is a light naphtha which contains olefins, including diolefins, and mono-cyclic aromatic hydrocarbons including benzene. Preferably the charge material also contains toluene and xylene. These charge stocks are available from high temperature thermal cracking of hydrocarbons to manufacture ethylene and propylene (pyrolysis gasoline), from delayed coking of heavy petroleum fractions (coker naphtha) and the like. Preferred charge stocks are those derived from steam cracking in ethylene or propylene manufacture. Typical analytical data for some typical pyrolysis gasolines are set forth in Table I.

TABLE I

| COMPOSITION OF TYPICAL PYROLYSIS GASOLINE (Weight Percent) | | |
| --- | --- | --- |
| Feed to cracker | Light Naphtha | Gas Oil |
| $C_5$ fraction | | |
| Diolefins | 7.8 | 16.2 |
| Olefins | 3.4 | 8.9 |
| Paraffins and naphthenes | 0.5 | 1.5 |
| $C_6$ fraction | | |
| Diolefins | 2.6 | 2.0 |
| Olefins | 4.7 | 3.2 |
| Paraffins and naphthenes | 2.5 | 2.7 |
| Benzene | 28.4 | 25.1 |
| $C_7$ fraction | | |
| Diolefins | 1.9 | 0.7 |
| Olefins | 3.7 | 1.0 |
| Paraffins and naphthenes | 1.8 | 0.7 |
| Toluene | 18.6 | 15.2 |
| $C_8$ fraction | | |
| Diolefins | 1.3 | 0.5 |
| Olefins | 2.5 | 0.7 |
| Paraffins and naphthenes | 0.8 | 0.5 |
| Xylenes | 8.9 | 6.5 |

TABLE I-continued

| COMPOSITION OF TYPICAL PYROLYSIS GASOLINE (Weight Percent) | | |
| --- | --- | --- |
| Feed to cracker | Light Naphtha | Gas Oil |
| Styrenes | 3.2 | 2.5 |
| $C_9^+$ fraction | | |
| Diolefins | 0.7 | 0.8 |
| Olefins | 1.0 | 0.8 |
| Paraffins and naphthenes | 0.7 | 0.8 |
| Aromatics | 5.0 | 9.7 |
| Total | 100.0 | 100.0 |

For use in accordance with this invention, it is unnecessary to hydrogen treat the pyrolysis gasoline unless that is found desirable for inhibition of gum formation during storage or shipment.

The olefinic charge stocks of the nature defined are reacted at high severity over a catalyst comprised by a zeolite of a special class combined with zinc and a metal of Group IB, namely copper, silver or gold, or a metal of Group VIII, preferably a noble metal of Group VIII, namely ruthenium, rhodium, palladium, osmium, iridium or platinum.

The zeolites employed in the process of the invention are those having a silica to alumina ratio of at least about 12 and a constraint index within the approximate range of 1 to 12. These zeolites induce profound transformations of aliphatic hydrocarbons to aromatic hydrocarbons in commercially desirable yields and are generally highly effective in conversion reactions involving aromatic hydrocarbons. Although they have unusually low alumina contents, i.e., high silica to alumina ratios, they are very active even when the silica to alumina ratio exceeds 30. The activity is surprising since catalytic activity is generally attributed to framework aluminum atoms and cations associated with these aluminum atoms. These zeolites retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. In many environments the zeolites of this class exhibit very low coke forming capability, conducive to very long times on stream between burning regenerations.

An important characteristic of the crystal structure of this class of zeolites is that it provides constrained access to, and egress from the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type zeolites useful in this invention possess, in combination: a silica to alumina mole ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although, in some instances, excessive puckering or pore blockage may render these zeolites ineffective. Twelve-membered rings do not generally appear to offer sufficient constraint to produce the advantageous conversions, although puckered structures exist such as TMA offretite which is a known effective zeolite. Also, structures can be conceived, due to pore blockage or other cause, that may be operative.

Rather than attempt to judge from crystal structure whether or not a zeolite possesses the necessary constrained access, a simple determination of the "constraint index" may be made by passing continuously a mixture of an equal weight of normal hexane and 3-methylpentane over a small sample, approximately 1 gram or less, of catalyst at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F for at least 15 minutes. The zeolite is then flushed with helium and the temperature adjusted between 550° F and 950° F to give an overall conversion between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. Zeolites suitable for the present invention are those having a constraint index in the approximate range of 1 to 12. Constraint Index (CI) values for some typical zeolites are:

| CAS | C.I. |
| --- | --- |
| ZSM-5 | 8.3 |
| ZSM-11 | 8.7 |
| ZSM-12 | 2 |
| ZSM-38 | 2 |
| ZSM-35 | 4.5 |
| TMA Offretite | 3.7 |
| Beta | 0.6 |
| ZSM-4 | 0.5 |
| H-Zeolon | 0.4 |
| REY | 0.4 |
| Amorphous Silica-Alumina | 0.6 |
| Erionite | 38 |

It is to be realized that the above constraint index values typically characterize the specified zeolites but that such are the cumulative result of several variables used in determination and calculation thereof. Thus, for a given zeolite depending on the temperature employed within the aforenoted range of 550° F to 950° F, with accompanying conversion between 10% and 60%, the constraint index may vary within the indicated approximate range of 1 to 12. Likewise, other variables such as the crystal size of the zeolite, the presence of possible occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination, with probability, in some instances, of compounding variable extremes. However, in all instances, at a temperature within the above-specified range of 550° F to 950° F, the constraint index will have a value for any given zeolite of interest herein within the approximate range of 1 to 12.

The class of zeolties defined herein is exemplified by ZSM-5, ZSM-11, ZSM-12, ZSM-35, ZSM-38, and other similar materials. U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-38 is more particularly described in U.S. application Ser. No. 528,060, filed Nov. 29, 1974, and now abandoned. This zeolite can be identified, in terms of mole ratios of oxides and in the anhydrous state, as follows:

$$(0.3-2.5)R_2O : (0-0.8)M_2O : Al_2O_3 : > 8 SiO_2$$

wherein R is an organic nitrogen-containing cation derived from a 2-(hydroxyalkyl) trialkylammonium compound and M is an alkali metal cation, and is characterized by a specified X-ray powder diffraction pattern.

In a preferred synthesized form, the zeolite has a formula, in terms of mole ratios of oxides and in the anhydrous state, as follows:

$$(0.4-2.5)R_2O : (0-0.6)M_2O : Al_2O_3 : xSiO_2$$

wherein R is an organic nitrogen-containing cation derived from a 2-(hydroxyalkyl)trialkylammonium compound, wherein alkyl is methyl, ethyl or a combination thereof, M is an alkali metal, especially sodium, and x is from greater than 8 to about 50.

The synthetic ZSM-38 zeolite possesses a definite distinguishing crystalline structure whose X-ray diffraction pattern shows substantially the significant lines set forth in Table II. It is observed that this X-ray diffraction pattern (significant lines) is similar to that of natural ferrierite with a notable exception being that natural ferrierite patterns exhibit a significant line at 11.33Å.

TABLE II

| d (A) | I/Io |
|---|---|
| 9.8 ± 0.20 | Strong |
| 9.1 ± 0.19 | Medium |
| 8.0 ± 0.16 | Weak |
| 7.1 ± 0.14 | Medium |
| 6.7 ± 0.14 | Medium |
| 6.0 ± 0.12 | Weak |
| 4.37 ± 0.09 | Weak |
| 4.23 ± 0.09 | Weak |
| 4.01 ± 0.08 | Very Strong |
| 3.81 ± 0.08 | Very Strong |
| 3.69 ± 0.07 | Medium |
| 3.57 ± 0.07 | Very Strong |
| 3.51 ± 0.07 | Very Strong |
| 3.34 ± 0.07 | Medium |
| 3.17 ± 0.06 | Strong |
| 3.08 ± 0.06 | Medium |
| 3.00 ± 0.06 | Weak |
| 2.92 ± 0.06 | Medium |
| 2.73 ± 0.06 | Weak |
| 2.66 ± 0.05 | Weak |
| 2.60 ± 0.05 | Weak |
| 2.49 ± 0.05 | Weak |

A further characteristic of ZSM-38 is its sorptive capacity providing said zeolite to have increased capacity for 2-methylpentane (with respect to n-hexane sorption by the ratio n-hexane/2-methyl-pentane) when compared with a hydrogen form of natural ferrierite resulting from calcination of an ammonium exchanged form. The characteristic sorption ratio n-hexane/2-methylpentane for ZSM-38 (after calcination at 600° C.) is less than 10, whereas that ratio for the natural ferrierite is substantially greater than 10, for example, as high as 34 or higher.

Zeolite ZSM-38 can be suitably prepared by preparing a solution containing sources of an alkali metal oxide, preferably sodium oxide, an organic nitrogen-containing oxide, an oxide of aluminum, an oxide of silicon and water and having a composition, in terms of mole ratios of oxides, falling within the following ranges:

| R+ | Broad | Preferred |
|---|---|---|
| R+ + M+ | 0.2-1.0 | 0.3-0.9 |
| OH−/SiO$_2$ | 0.05-0.5 | 0.07-0.49 |
| H$_2$O/OH− | 41-500 | 100-250 |
| SiO$_2$/Al$_2$O$_3$ | 8.8-200 | 12-60 | wherein R is an organic nitrogen-containing cation derived from a 2-(hydroxyalkyl) trialkylammonium compound and M is an alkali metal ion, and maintaining the mixture until crystals of the zeolite are formed. (The quantity of OH− is calculated only from the inorganic sources of alkali without any organic base contribution). Thereafter, the crystals are separated from the liquid and recovered. Typical reaction conditions consist of heating the foregoing reaction mixture to a temperature of from about 90° C. to about 400° C. for a period of time of from about 6 hours to about 100 days. A more preferred temperature range is from about 150° C. to about 400° C. with the amount of time at a temperature in such range being from about 6 hours to about 80 days.

The digestion of the gel particles is carried out until crystals form. The solid product is separated from the reaction medium, as by cooling the whole to room temperature, filtering and water washing. The crystalline product is thereafter dried, e.g. at 230° F. for from about 8 to 24 hours.

ZSM-35 is more particularly described in U.S. Pat. application Ser. No. 528,061, filed Nov. 29, 1974, and now U.S. Pat. No. 4,016,245. This zeolite can be identified, in terms of mole ratios of oxides and in the anhydrous state, as follows:

$$(0.3-2.5)R_2O : (0-0.8)M_2O : Al_2O_3 : > 8\ SiO_2$$

wherein R is an organic nitrogen-containing cation derived from ethylenediamine or pyrrolidine and M is an alkali metal cation, and is characterized by a specified X-ray powder diffraction pattern.

In a preferred synthesized form the zeolite has a formula, in terms of mole ratios of oxides and in the anhydrous state, as follows:

$$(0.4-2.5)R_2O : (0.06)\ M_2O : Al_2O_3 : xSiO_2$$

wherein R is an organic nitrogen-containing cation derived from ethylenediamine or pyrrolidine, M is an alkali metal, especially sodium, and x is from greater than 8 to about 50.

The synthetic ZSM-35 zeolite possesses a definite distinguishing crystalline structure whose X-ray diffraction pattern shows substantially the significant lines set forth in Table III. It is observed that this X-ray diffraction pattern (with respect to significant lines) is similar to that of natural ferrierite with a notable exception being that natural ferrierite patterns exhibit a significant line at 11.33Å. Close examination of some individual samples of ZSM-35 may show a very weak line at 11.3-11.5Å. This very weak line, however, is determined not to be a significant line for ZSM-35.

TABLE III

| d (A) | I/Io |
|---|---|
| 9.6 ± 0.20 | Very Strong- Very Very Strong |
| 7.10 ± 0.15 | Medium |
| 6.98 ± 0.14 | Medium |
| 6.64 ± 0.14 | Medium |
| 5.78 ± 0.12 | Weak |
| 5.68 ± 0.12 | Weak |
| 4.97 ± 0.10 | Weak |
| 4.58 ± 0.09 | Weak |
| 3.99 ± 0.08 | Strong |
| 3.94 ± 0.08 | Medium Strong |
| 3.85 ± 0.08 | Medium |
| 3.78 ± 0.08 | Strong |
| 3.74 ± 0.08 | Weak |
| 3.66 ± 0.07 | Medium |
| 3.54 ± 0.07 | Very Strong |
| 3.48 ± 0.07 | Very Strong |
| 3.39 ± 0.07 | Weak |
| 3.32 ± 0.07 | Weak Medium |
| 3.14 ± 0.06 | Weak Medium |
| 2.90 ± 0.06 | Weak |
| 2.85 ± 0.06 | Weak |
| 2.71 ± 0.05 | Weak |
| 2.65 ± 0.05 | Weak |
| 2.62 ± 0.05 | Weak |
| 2.58 ± 0.05 | Weak |
| 2.54 ± 0.05 | Weak |
| 2.48 ± 0.05 | Weak |

A further characteristic of ZSM-35 is its sorptive capacity proving said zeolite to have increased capacity for 2-methylpentane (with respect to n-hexane sorption by the ratio n-hexane/2-methylpentane) when compared with a hydrogen form of natural ferrierite resulting from calcination of an ammonium exchanged form. The characteristic sorption ratio n-hexane/2-methylpentane for ZSM-35 (after calcination at 600° C.) is less than 10, whereas that ratio for the natural ferrierite is substantially greater than 10, for example, as high as 34 or higher.

Zeolite ZSM-35 can be suitably prepared by preparing a solution containing sources of an alkali metal oxide, preferably sodium oxide, an organic nitrogen-containing oxide, an oxide of aluminum, an oxide of silicon and water and having a composition, in terms of mole ratios of oxides, falling within the following ranges:

| R+ | Broad | Preferred |
|---|---|---|
| R+ + M+ | 0.2–1.0 | 0.3–0.9 |
| $OH^-/SiO_2$ | 0.05–0.5 | 0.07–0.49 |
| $H_2O/OH^-$ | 41–500 | 100–250 |
| $SiO_2/Al_2O_3$ | 8.8–200 | 12–60 | wherein R is an organic nitrogen-containing cation derived from pyrrolidine or ethylenediamine and M is an alkali metal ion, and maintaining the mixture until crystals of the zeolite are formed. (The quantity of $OH^-$ is calculated only from the inorganic sources of alkali without any organic base contribution). Thereafter, the crystals are separated from the liquid and recovered. Typical reaction conditions consist of heating the foregoing reaction mixture to a temperature of from about 90° C. to about 400° C. for a period of time of from about 6 hours to about 100 days. A more preferred temperature range is from about 150° C. to about 400° C. with the amount of time at a temperature in such range being from about 6 hours to about 80 days.

The digestion of the gel particles is carried out until crystals form. The solid product is separated from the reaction medium, as by cooling the whole to room temperature, filtering and water washing. The crystalline product is dried, e.g. at 230° F., for from about 8 to 24 hours.

The specific zeolites described, when prepared in the presence of organic cations, are catalytically inactive, possible because the intracrystalline free space is occupied by organic cations from the forming solution. They may be activated by heating in an inert atmosphere at 1000° F. for 1 hour, for example, followed by base exchange with ammonium salts followed by calcination at 1000° F. in air. The presence of organic cations in the forming solution may not be absolutely essential to the formation of this type zeolite; however, the presence of these cations does appear to favor the formation of this special type of zeolite. More generally, it is desirable to activate this type catalyst by base exchange with ammonium salts followed by calcination in air at about 1000° F. for from about 15 minutes to about 24 hours.

Natural zeolites may sometimes be converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred crystalline aluminosilicate are ZSM-5, ZSM-11, ZSM-12, ZSM-38 and ZSM-35, with ZSM-5 particularly preferred.

In a preferred aspect of this invention, the zeolites hereof are selected as those having a crystal framework density, in the dry hydrogen form, of not substantially below about 1.6 grams per cubic centimeter. It has been found that zeolites which satisfy all three of these criteria are most desired because they tend to maximize the production of gasoline boiling range hydrocarbon products. Therefore, the preferred zeolites of this invention are those having a constraint index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density, of course, must be associated with a relatively small amount of free space within the crystal, which might be expected to result in more stable structures. This free space, however, is important as the locus of catalytic activity.

Crystal framework densities of some typical zeolites are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable ions of Groups IB to VIII of the Periodic Table, including, by way of example, nickel copper, zinc, palladium, calcium or rare earths metals.

In practicing the desired conversion process, it may be desirable to incorporate the above described crystalline aluminosilicate zeolite in another material resistant to the temperature and other conditions employed in the process. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix may vary widely with the zeolite content ranging from between about 1 to about 99 percent by weight and more usually in the range of about 5 to about 80 percent by weight of the composite.

The composite catalyst of the invention is prepared by incorporating into the zeolite the desired combination of zinc and a metal capable of forming an alloy with zinc and the oxide of which is readily reduced to the metal, viz. the metals of Groups IB and VIII. The metals may be introduced to the zeolite by any of the techniques known to the art of preparing composite catalysts from zeolites. Conveniently, the composite of metal and zeolite is prepared by impregnation. For example, the zeolite is caused to absorb a water solution of zinc acetate containing the desired amount of metal. The zeolite is then dried and calcined to decompose the zinc salt and a suitable amount of palladium ammine chloride in water solution is absorbed by the zeolite. After drying and calcining, the composite is reduced in hydrogen. In general, amounts of each metal will be about 0.2 to 5.0 weight percent of the finished composite of bi-metallic zeolite.

As previously pointed out, it is known that zinc impregnated in zeolites of the present type (e.g. Zn ZSM-5) provides an effective catalyst for aromatization of olefins. At the temperatures employed in the present process, metallic zinc has appreciable vapor pressure and is eluted from the catalyst such that activity is lost in a matter of days or hours under the reducing atmosphere of hydrocarbon charge. It was surprisingly found that the addition of metals such as palladium strongly retards or prevents the elution of zinc. While the exact reason for this effect has not been established, it is theorized that it is caused by an interaction such as alloy formation between the two different metals. Whatever the reason, it is surprising that the powerful catalytic metal palladium does not enhance activity of the catalyst in the sense of achieving increased conversion. In fact, palladium alone composited with ZSM-5 shows little or no effect as compared with the hydrogen form (HZSM-5). However, when combined with zinc on ZSM-5, palladium is seen to improve selectivity of the catalyst for production of the desired lower boiling aromatics at the expense of the heavier, undesirable aromatics of nine or more carbon atoms ($C_9^+$).

A simple test shows the catalytic properties of various ZSM-5 catalysts. In this test, propane was passed over the catalyst at atmospheric pressure, a temperature of 1000° F and a WHSV = 1.0. Comparative results are shown in Table IV.

TABLE IV

| Catalyst Metal, % | HZSM-5 | HZSM-5 Pd 1% | HZSM-5 Zn 5% | HZSM-5 Zn 5%, Pd 1% |
|---|---|---|---|---|
| Propane Conversion, % | 47 | 41 | 99 | 87 |
| Aromatics Yield, Wt. % | 14 | 14 | 33 | 33 |
| % Benzene in Aromatics | 24 | 24 | 29 | 44 |
| % $C_9^+$ in Aromatics | | | 31 | 14 |

Addition of Pd surprisingly has no effect on aromatics production. Both Zn and Zn-Pd give greatly enhanced conversion and aromatics yield. Zn-Pd, however, is not only much more stable, but has a different product selectivity: it produces 52% more of the most valuable aromatic, benzene, relative to Zn, and correspondingly much less of the least valuable $C_9^+$ aromatics.

5% Zn/HZSM-5 and 5% Zn/1% Pd/HZSM-5 were prepared by single-step and two-step impregnations, respectively. Both catalysts were subjected to high temperature treatment in the presence of hydrogen at 1100° F. Their relative stabilities are shown in FIG. 2. Zn/HZSM-5 lost 100% of Zn during 4 days on stream, while Zn/Pd-HZSM-5 lost only 65% of its Zn during 7 days on stream and there was no more Zn loss between 7 and 14 days on stream. This indicated that 5% Zn/1% Pd/HZSM-5 is unstable, whereas a stable bimetallic catalyst contains 1.5% Zn and 1.0% Pd on HZSM-5.

A preferred feedstock for the production of BTX hydrocarbons is pyrolysis gasoline obtained from the thermal cracking of naphtha, gas oil or residua. If production of the lighter aromatics is desired the pyrolysis gasoline may be fractionated to obtain an overhead fraction (about 75%) containing predominantly $C_5-C_7$ hydrocarbons. Prior to processing according to this proposal, the pyrolysis gasoline can optionally be hydrotreated under mild conditions (e.g., 500° F, Ni or noble metal catalyst) to improve its stability without hydrogenating a major proportion of the olefins.

The upgrading process is carried out at a temperature of 900°–1200° F, a pressure of about atmospheric to 400 psig and a WHSV of 0.3–30.

The upgrading consists of producing an effluent with an increased yield of aromatics and particularly of valuable BTX hydrocarbons. In a specific objective, the pyrolysis gasoline is processed to yield a liquid fraction containing less than 5% and preferably less than 1% of non-aromatics in the fraction boiling above 167° F. This is accomplished by operating the process under more severe conditions, e.g., T ≧ 980° F, WHSV ≦ 5. The product obtained under these more severe conditions can be used for the production of commercial grade aromatics, e.g., benzene, toluene, ethylbenzene and xylenes, by simple distillation without the need for an expensive aromatics extraction process as is presently required.

A composite catalyst of 1.5% Zn/1.0% Pd/ZSM-5 was prepared by two-step impregnation followed by calcination, and treatment with $H_2$ at 1100° F for two weeks.

Pyrolysis gasoline (not hydrotreated, taken from 75% overhead fraction) was obtained from a commercial ethylene plant and was percolated through activated alumina prior to use.

Upgrading over the above catalyst was conducted in a quartz reactor in a down-flow fashion. The total liquid and gas were collected and analyzed by gas chromatograph. The operating conditions were 1000° F, 1 atm, 2 WHSV and no $H_2$.

The detailed product distribution, along with the feed composition are given in Table V. Clearly, there is not only an increase in BTX but also an increase in benzene. In addition, the product was free of $C_5^+$ non-aromatics. This indicates that solvent extraction can be eliminated.

TABLE V
UPGRADING OF PYROLYSIS GASOLINE

| | Weight Percent | | |
|---|---|---|---|
| | Feed | Product | Net Change |
| Hydrogen | — | 0.8 | |
| $C_1$ | — | 1.2 | |
| $C_2$ | — | 2.9 | +6.8 |
| $C_3$ | — | 1.6 | |
| $C_4$ | — | 0.3 | |
| $C_5^+$ Non aromatics | 22.9 | — | −22.9 |
| Benzene | 42.1 | 44.4 | +2.3 |
| Toluene | 26.7 | 32.3 | +5.6 |
| Ethylbenzene | 0.1 | 0.5 | +0.4 |
| Xylenes | 0.1 | 6.7 | +6.6 |
| $C_9$ Aromatics | — | 1.1 | +9.3 |
| $C_{10}^+$ Aromatics | — | 8.2 | |
| Undetermined | 8.1 | — | −8.1 |
| | 100.0 | 100.0 | |
| BTX | 69.0 | 83.9 | +14.9 |

The non-hydrotreated pyrolysis gasoline (feedstock) after alumina percolation contained 1990 ppm of sulfur. The sulfur analysis showed that the product contained 4–23 ppm. A slightly more severe condition may be needed in order to reduce the sulfur level to meet the specification of 1 ppm sulfur for nitration grade benzene.

Under the conditions of 1000° F, 1 atm, 2 WHSV, and no hydrogen, a cycle length of almost one day was established. Regenerability of this catalyst has been demonstrated in other services.

A proposed process scheme with mass balance, as compared to the conventional process, is provided in FIG. 1.

We claim:

1. A process for upgrading of pyrolysis gasoline and other olefinic naphthas which contain olefins which comprises contacting said naphtha at severe conditions of 900° to 1200° F, a pressure of atmospheric to 400 pounds per square inch and weight hourly space velocity of 0.3 to 30 with a catalyst composite of zinc and at least one metal selected from the groups consisting of IB and VIII of the Periodic Table in intimate association with a porous crystalline aluminosilicate zeolite having a silica to alumina ratio of at least 12 and a constraint index between 1 and 12.

2. The process of claim 1 conducted at a severity to yield a liquid product fraction containing less than 5% of non-aromatic hydrocarbons boiling above 167° F.

3. The process of claim 1 conducted at a severity to yield a liquid product containing less than 1% of non-aromatic hydrocarbons boiling above 167° F.

4. The process of claim 1 conducted at a severity to yield a liquid product containing substantially no non-aromatic hydrocarbons boiling above 167° F.

5. The process of claim 1 wherein said metal of Group VIII is ruthenium, rhodium, palladium, osmium, iridium or platinum.

6. The process of claim 5 wherein said metal is palladium.

7. The process of claim 1 conducted at a temperature not lower than 980° F and weight hourly space velocity not greater than 5.

8. The process of claim 1 wherein the charge naphtha contains diolefins.

* * * * *